(12) United States Patent
Puckett et al.

(10) Patent No.: US 7,634,974 B1
(45) Date of Patent: Dec. 22, 2009

(54) BIRD FEEDER

(75) Inventors: Betsy P. Puckett, Foster, RI (US); Marco Wo, Providence, RI (US)

(73) Assignee: Droll Yankees, Inc., Foster, RI (US)

( * ) Notice: Subject to any disclaimer, the term of this patent is extended or adjusted under 35 U.S.C. 154(b) by 0 days.

(21) Appl. No.: 11/893,067

(22) Filed: Aug. 14, 2007

Related U.S. Application Data (60) Provisional application No. 60/837,753, filed on Aug. 15, 2006.

(51) Int. Cl.
*A01K 7/00* (2006.01)
(52) U.S. Cl. ...................... 119/74; 119/61.57
(58) Field of Classification Search .............. 119/72, 119/74, 464, 465, 475, 477, 61.57; D30/121, D30/128, 132, 133; 222/167, 164
See application file for complete search history.

(56) References Cited

U.S. PATENT DOCUMENTS

| 153,106 | A | * | 7/1874 | McConnell | 119/464 |
| 1,537,615 | A | * | 5/1925 | McConnell | 119/465 |
| 1,886,015 | A | * | 11/1932 | Henning et al. | 119/465 |
| 2,619,313 | A | * | 11/1952 | Whittington | 248/230.4 |
| 6,484,667 | B2 | * | 11/2002 | Pelletier | 119/72.5 |
| 6,783,033 | B1 | * | 8/2004 | Chan | 222/166 |
| 2008/0282989 | A1 | * | 11/2008 | Nylen | 119/72 |

* cited by examiner

*Primary Examiner*—Kimberly S Smith
(74) *Attorney, Agent, or Firm*—Salter & Michaelson (57) ABSTRACT

A miniature size bird feeder that includes a feed holder; a cap or cover over the feed holder; means for releasably attaching the cap or cover to the feed holder and an attachment means for supporting the feed holder.

11 Claims, 7 Drawing Sheets

BIRD FEEDER

RELATED APPLICATIONS

Priority for this application is hereby claimed under 35 U.S.C. § 119(e) to commonly owned and co-pending U.S. Provisional Patent Application No. 60/837,753 which was filed on Aug. 15, 2006 and which is incorporated by reference herein in its entirety.

TECHNICAL FIELD

The present invention relates generally to bird feeders and pertains, more particularly, to bird feeders used particularly for feeding hummingbirds.

BACKGROUND OF THE INVENTION

There are numerous types of bird feeders that are available. However, most of these bird feeders are adapted for use with average-size birds. Existing bird feeders are relatively large and are appropriate for only certain placements.

Wild bird feeders are typically placed in somewhat permanent positions around a person's house and in their yard or garden. They can be hung from trees or poles, mounted on windows or window sills, screwed to trees or buildings and other such semi permanent positions where they can be observed for the enjoyment of bird watching. During warmer weather, when people spend more time in their yards, they may not always be able to view their bird feeders from all areas. Additionally, it is desirable to many people to attract wild birds closer to them where they can enjoy them in detail, their intricate forms, colors and wild behavior. While most wild birds tend to be skittish by nature and fly away when humans are around, some species are more apt to feed near humans.

Accordingly, it is an object of this invention to provide a bird feeder that can be transported easily and can be readily attached to a wide variety of objects in the yard.

Still another object of the present invention is to provide a bird feeder that is relatively small in size and that is particularly adapted for feeding hummingbirds or other similar small birds.

Another object of the present invention is to provide a small bird feeder that is relatively simple in construction and that preferably has a holder and a readily releasable top with one or more apertures for providing access of the hummingbird to the feed holder.

Still another object of the present invention is to provide a bird feeder preferably for hummingbirds and that has a versatile attachment means that enables the feeder to be supported from any number of different objects or on its own.

SUMMARY OF THE INVENTION

To accomplish the foregoing and other objects, features and advantages of the present invention, there is provided a versatile bird feeder that is relatively small in size and that is particularly adapted for the feeding of hummingbirds or the like small birds. The various embodiments of the invention that are described herein all are characterized by a versatility of attachment. This attachment provides a simple way of supporting the feeder from any number of different objects. The feeder bowl is basically a food holder, and in the preferred embodiment, a screw top is used having one or more apertures through which the bird may access the feed within the holder. The preferred form of attachment of the feeder is a flexi-tube system. A side stem may also be provided as an additional feature positioned as a perch.

In accordance with the invention there is provided a miniature size bird feeder that includes a feed holder; a cap or cover over the feed holder; means for releasably attaching the cap or cover to the feed holder and an attachment means for supporting the feed holder. The attachment means may comprise any one or more of a pivot clamp; a plurality of support legs; a clamp hanger; a handle; an elastic band; a flexible line that is adapted to be bent into various configurations. The cover or cap is preferably engaged with the holder by being screwed thereon. The feed holder preferably has at least one feed port sized for access by a small bird.

In accordance with the invention there is provided a miniature size bird feeder that includes a feed holder; a cap or cover over the feed holder; means for releasably attaching the cap or cover to the feed holder and an attachment means for supporting the feed holder. The attachment means may comprise one or more of a pivot clamp; a plurality of support legs; a clamp hanger; a handle; an elastic band; a flexible line that is adapted to be bent into various configurations. The cover or cap may be engaged with said holder by being screwed thereon.

In accordance with another aspect of the present invention there is provided a miniature size bird feeder that includes a feed holder having a feed port sized for access by a small bird and an attachment means for supporting the feed holder. The attachment means preferably comprises a flexible line that is adapted to be bent into various configurations for support of the holder.

In accordance with still another aspect of the present invention there is provided a miniature size bird feeder that includes a feed holder, a cap or cover over the feed holder, said cap or cover being provided with at least one feed port, said cap or cover being releasably attached to an opening in the feed holder, and an attachment member for supporting the feed holder either in a self-supporting manner or from another object. The attachment member may comprise one or more of a pivot clamp; a plurality of support legs; a clamp hanger; a handle; an elastic band; a flexible line that is adapted to be bent into various configurations; a plurality of flexible stem members that are each able to be formed into a predetermined configuration and maintained in that configuration for support of the holder. The stem member may have a wire inside covered by a soft flexible material. There may also be provided a separate stem piece integrally attached with the stem member and adapted to form a perch.

BRIEF DESCRIPTION OF THE DRAWINGS

Numerous other objects, features and advantages of the present invention should now become apparent upon a reading of the following detailed description taken in conjunction with the accompanying drawings, in which:

FIG. 1 illustrates one embodiment of a bird feeder in accordance with the present invention employing a pivot clamp for attachment;

FIG. 2 illustrates a feeder with a series of legs for attachment support;

FIG. 3 illustrates a bird feeder with a clamp hanger arrangement for attachment;

FIG. 4 illustrates a bird feeder with a positionable handle;

FIG. 5 illustrates a bird feeder with an attachment by means of an elastic band;

FIG. 6 illustrates a bird feeder in which the attachment is by means of a flexible line; and FIG. 7 illustrates a series of additional concepts for feeders similar to those described in FIGS. 1-6.

DETAILED DESCRIPTION

There are described herein a number of different embodiments of a portable, miniature bird feeder that is meant primarily for feeding hummingbirds, although it may also be used for feeding other small birds. In addition to being small and thus readily portable, the feeders that are described herein are also characterized by a unique and simple attachment means so that the feeders can be positioned virtually anywhere. The attachment means provides a way to attach the feeder to any deck rail, arbor rod, chair arm, finger, toe, hat brim, umbrella pole, table top, bird bath, and virtually any object that one would find outside in the yard. Alternatively, the feeder may even be planted in or attached to a flower box. Also, in addition to hanging or other means of attachment, the bird feeder may be constructed so as to be self-standing.

In all of the embodiments that are described herein, the bird feeder is comprised of a feeder bowl that may be used for storing bird seed or other food products, such as meal worms, nectars, fruit, jelly, or suet. The bowl is preferably transparent so the observer can see the level of feed in the bowl.

In addition to the feeder bowl, there is a top that is provided on the feeder, and the top preferably has one or more ports through which the bird accesses the feed in the holder. In the preferred embodiment, the top may be screwed on the base or feeder bowl. The top is preferably formed as a flower head, and in this regard the preferred embodiment of the present invention is that illustrated in FIG. 6. This flower-head design provides a very aesthetic appeal to the bird feeder, and in some sense almost makes it not look like a typical bird feeder. In addition to the flower head, other tops may be used, such as a lady bug or butterfly.

Another feature of the present invention particularly relating to the preferred embodiment of FIG. 6 is the use of a side stem that can be positioned as a perch. Although most hummingbirds hover, some may choose to sit on a perch. Also, the preferred embodiment of FIG. 6 shows a flower type cover in which case the pedals form a type of perch adjacent to the feed port.

As mentioned previously, the preferred cover is screwed onto the base. This arrangement makes it quite easy to thoroughly clean the bird feeder. The feeder itself can be made of various types of materials including glass, plastic or metal. The bowl that holds the seed is preferably transparent so that the level of the nectar is visible.

The first embodiment of the present invention is illustrated in FIG. 1 with the feeder disposed in two different orientations. The feeder is comprised of a seed or nectar holder 10 that is preferably transparent so as to be able to see the level 11 of the nectar within the holder 10. The holder 10 has the cap or cover 12 disposed thereover. Both the holder 10 and the cap 12 are preferably constructed of a plastic material, and the holder 10 is preferably transparent. The cover or cap may be attached to the holder 10 in a variety of different ways and is preferably screwed onto the holder 10. The cap or cover 12 is provided with open ports 14 through which access is provided by the hummingbird to the feed holder. This particular embodiment also includes, integral width of the cover 12, an annular ridge 16 that forms a perch for the bird. The ridge 16 may alternatively be attached to the holder 10.

The bottom of the feed holder 10 provides a socket 18 from which the bird feeder is supported. This support is provided by a pivot clamp 20 that includes arms 22 and 24 that are pivotal about the pivot point or joint 25. A link 26 connects the pivot clamp 20 to the socket 18. The link 26 may have a ball at the end where it connects with the socket 18 and has some type of a pivot joint end at the joint 25.

Figure 1A:
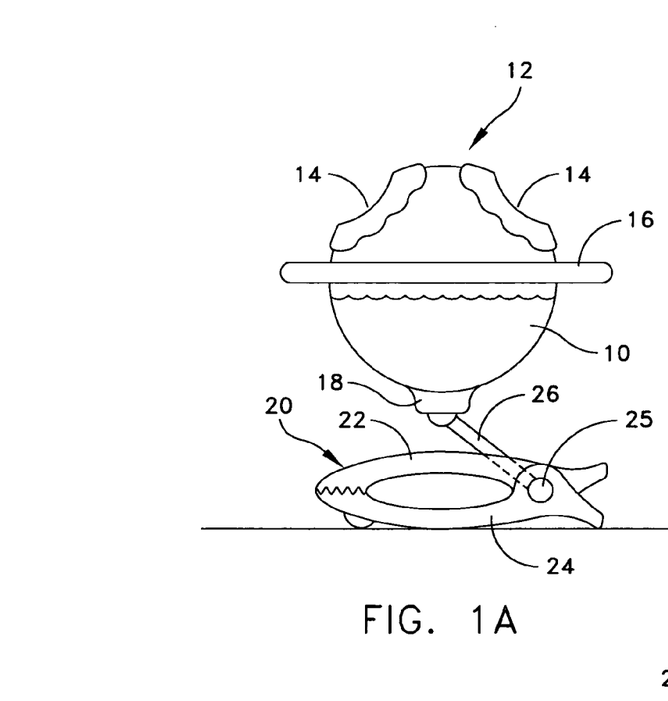

FIG. 1A illustrates the pivot clamp 20 used as a base for supporting the feed holder. In FIG. 1A the feed holder is self-supporting. The link 26 may be pivoted with both the clamp 20 and the seed holder 10 so that it can be moved into various different positions and maintained in those positions. In that regard, the link 26 is preferably attached to the clamp 20 with a somewhat tight fit so that once the holder is positioned it will stay in that position until the link is rotated to a different position. The connection at the socket 18 also preferably provides a rather tight fit so that the holder can be maintained in an upright position as shown in FIG. 1A, if desired.

Figure 1B:
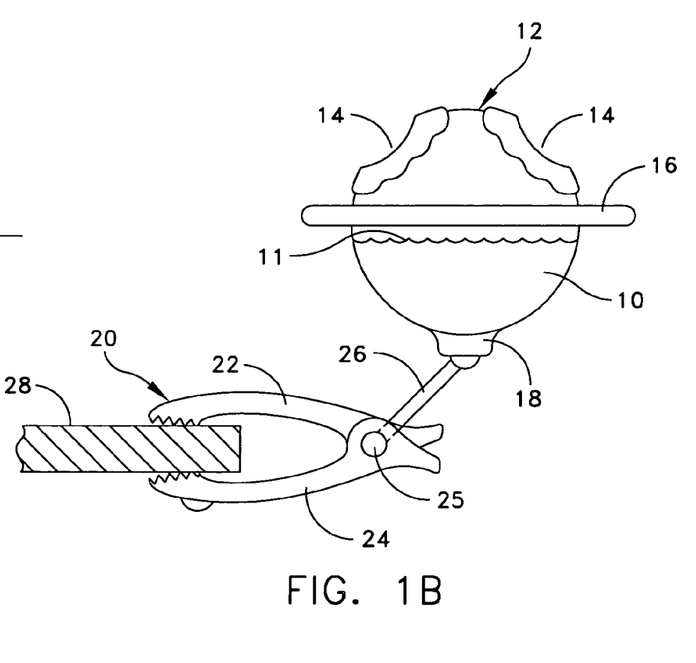

FIG. 1B illustrates the pivot clamp 20 as clamped about a shelf or rail 28. Even in this position, the bird feeder can be positioned in a variety of different orientations by means of pivoting at either end of the link 26. Again the connections at the ends of the link 26 are preferably relatively tight so that once a position is set the holder stays in that position.

FIG. 2 illustrates another embodiment of the present invention. This embodiment includes a nectar holder 30 and a cap 32. As with the first embodiment, the cap 32 may be secured to the holder 30 in a number of different ways. A preferred way is to have the cap screw on to the holder. Alternatively, a tight slide fit may be used between the cap and holder. In the embodiment of FIG. 2, it is noted that the cap has a somewhat decorative effect. The cap is provided with one or more through ports to provide access to the inside of the holder 30. FIG. 2 illustrates the holder 30 as being transparent, illustrating the liquid line of the nectar at 31.

Figures 2A, 2B, 2C, 2D:
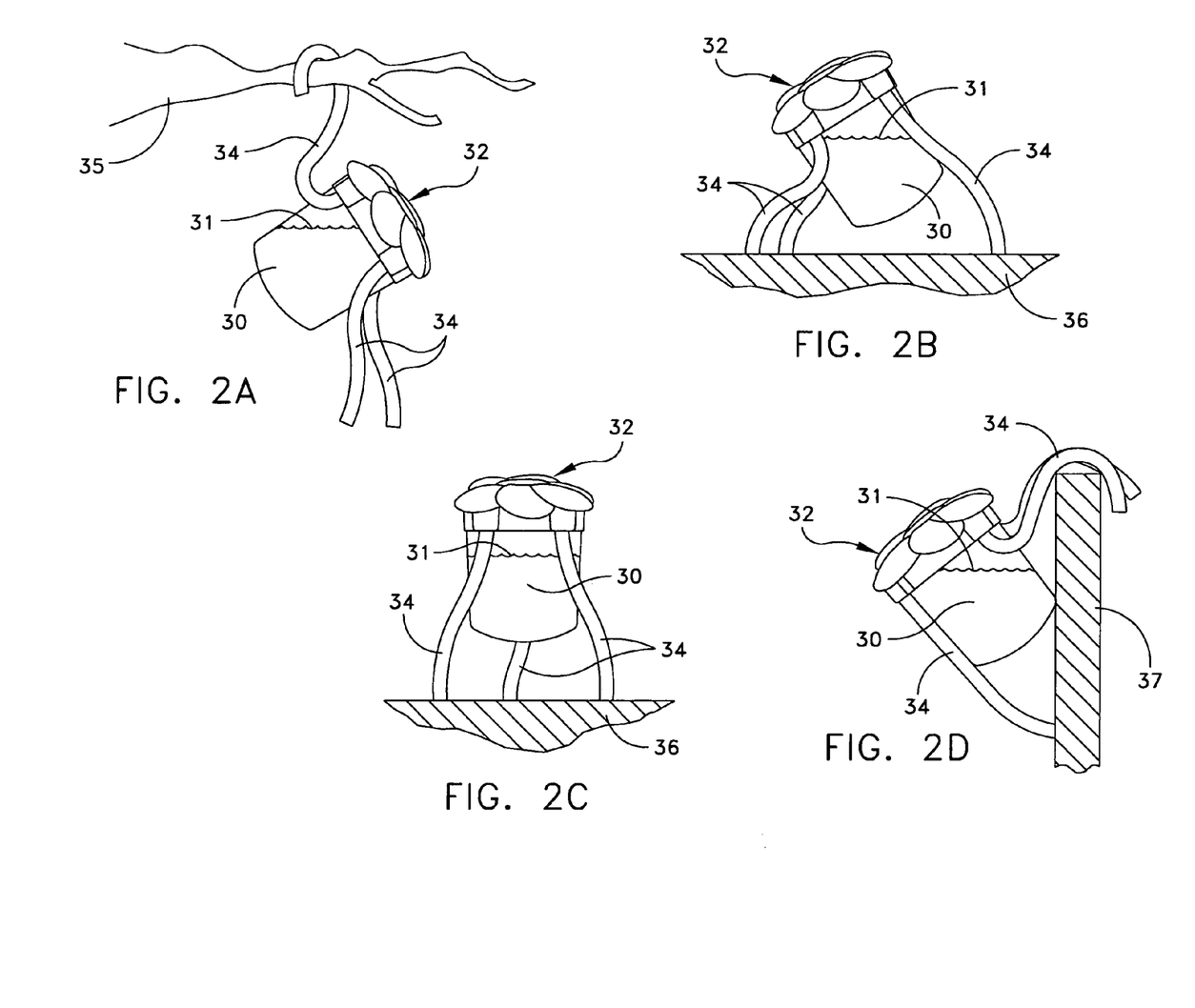

FIG. 2 also shows an attachment or support means in the form of a series of support legs 34 that enable the feeder to be supported in a number of different ways including for self-support. FIGS. 2B and 2D illustrate self-supporting arrangements. FIG. 2A illustrates one leg 34 supporting the feeder from a branch 35. In other embodiments the series of legs 34 maybe used to self-support the holder from a base 36. In still another embodiment of the present invention shown in FIG. 2D, the legs 34 may be used to support the holder from an upright piece 37.

In the embodiment of FIG. 2 there is a plurality of legs 34. There may be three or four of these legs. Each of the legs is flexible but once bent will maintain the bent configuration. In this regard refer to FIG. 6A and a typical leg construction that may include an outer foam or rubber sheath and an inner wire that provides some degree of stiffness to the leg construction.

Reference is now made to FIG. 3 for still a further embodiment of the present invention. This embodiment includes a substantially spherical holder 40 having a cap 42 that is secured to the holder 40. As illustrated in a perspective view in the embodiment of FIG. 3, the cap 42 is provided with a single centrally disposed port 44 to provide access by the bird to the nectar within the spherical holder 40. The cap 42 may be screwed onto or may be snap fit with the spherical holder 40.

Figure 3A:
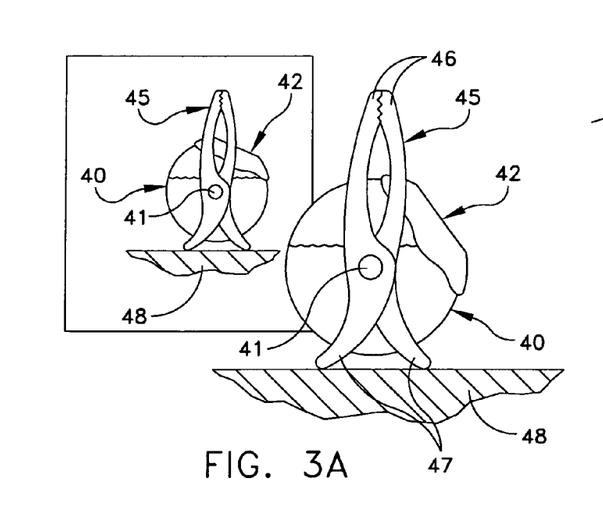
Figure 3B:
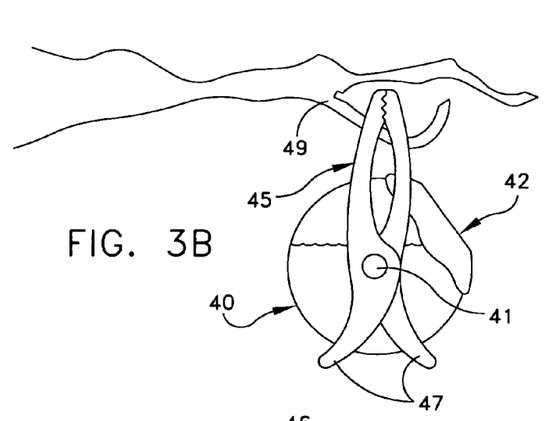
Figure 3C:
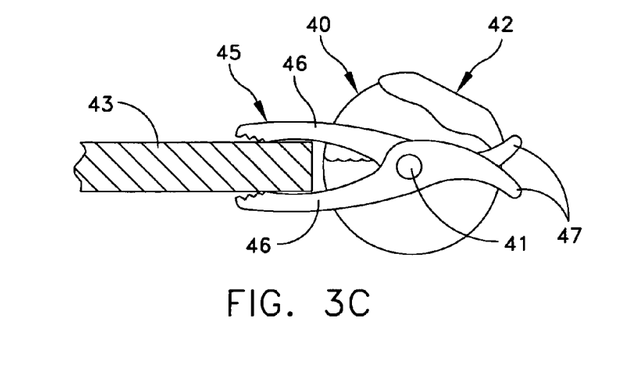
Figure 3D:
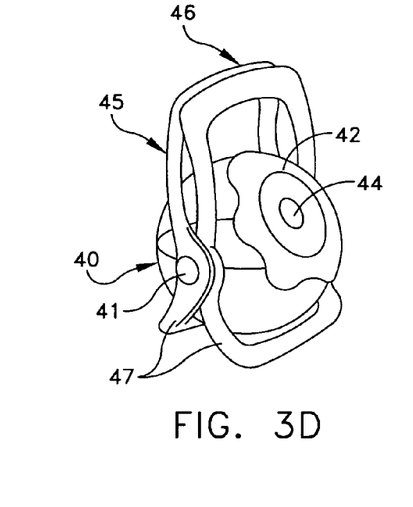

Refer in FIG. 3D also to the perspective view that illustrates the clamp hanger 45. The hanger 45 is supported from the spherical holder 40 at the pivot 41. The clamp hanger 45 includes a pair of jaws 46 at one end and a pair of legs 47 at the other end. The attachment between the clamp hanger 45 and the holder 40 is preferably a relatively tight fit so that the position therebetween can be maintained once it is set, as discussed before. Also, the clamp hanger 45 preferably has associated therewith a biasing means, usually in the form of a spring, so as to maintain a force on the jaws toward a closed position thereof.

FIG. 3 illustrates a number of different ways that the clamp hanger can be used in this embodiment of the invention. In one embodiment shown in FIG. 3A the legs 47 are used for supporting the bird feeder from a base 48. In another embodiment of the invention shown in FIG. 3B, the jaws 46 of the hanger may be used for supporting the feeder from a branch 49 or the like. In still another embodiment of the present invention, as shown in FIG. 3C, the jaws 46 may be used for grasping a rail 43 in supporting the feeder.

FIG. 4 illustrates still another embodiment of the present invention. This embodiment includes a feed holder 50 and a cap 52. As in previous embodiments, the cap 52 may be secured to the holder 50 in a number of different ways. The cap 52 is provided with one or more through ports 54 to provide access to the inside of the holder 50. Refer to FIG. 4D showing the use of two ports 54. The holder 50 is also preferably transparent so that the level of the feed within the holder can be observed.

FIG. 4 also shows an attachment means in the form of a U-shaped handle 55 that has opposite ends received within a slot 56 in the holder 50. The slot 56 enables the handle 55 to be moved such as in the direction indicated by the arrows A in FIGS. 4B and 4D. The opposite ends 57 of the handle 55 fit within the slot 56 and maybe arranged so as to interlock in the slot in various positions. For this purpose the ends 57 are preferably disposed at a right angle as shown in FIG. 4D. The interlock of the handle 55 is preferably relatively tight so that the position can be maintained once set.

Figure 4A:
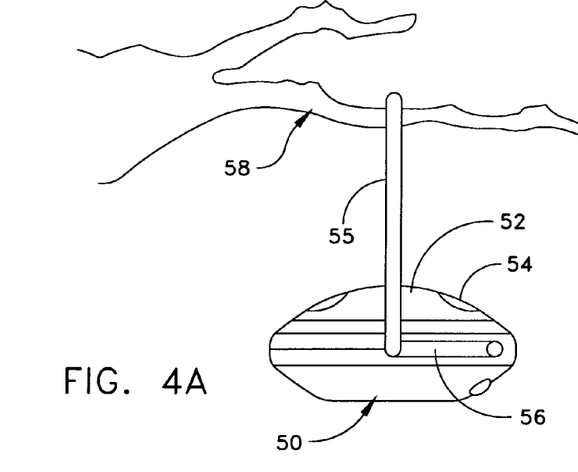
Figure 4B:
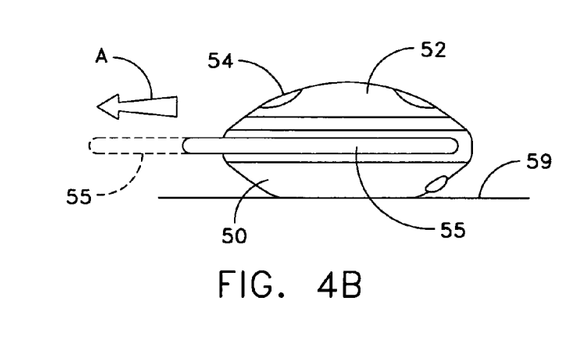
Figure 4C:
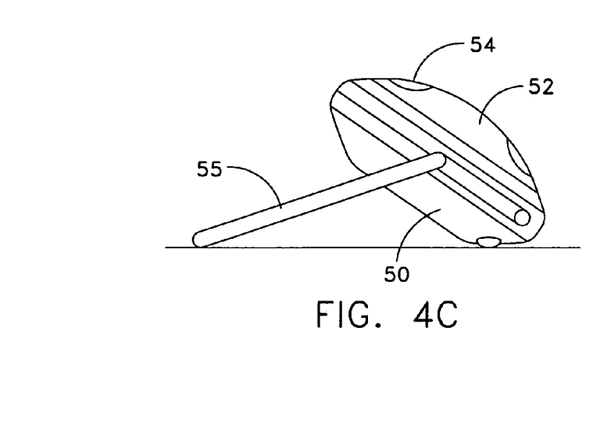
Figure 4D:
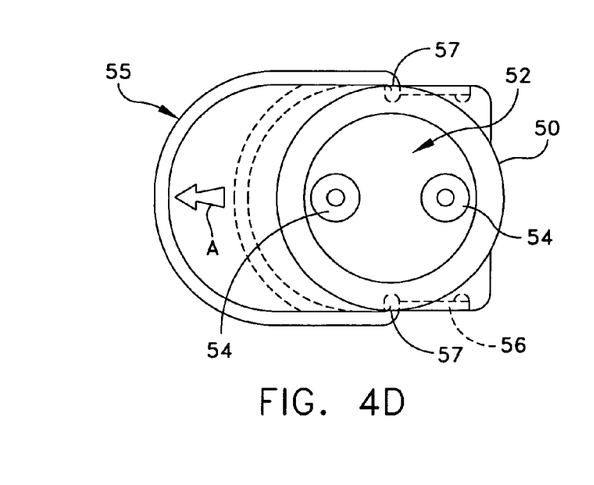
Figure 5A:
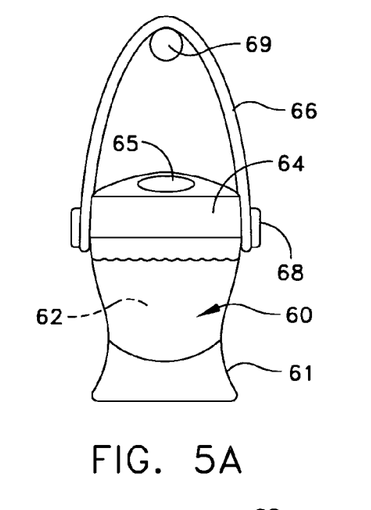
Figure 5B:
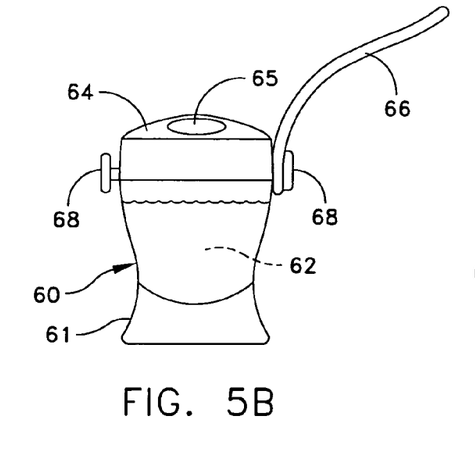
Figure 5C:
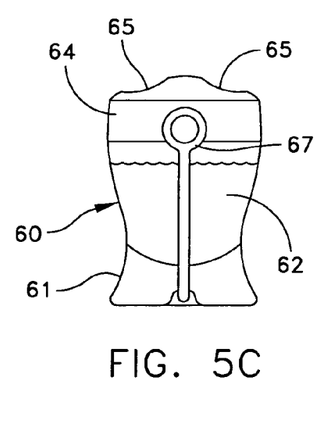
Figure 5D:
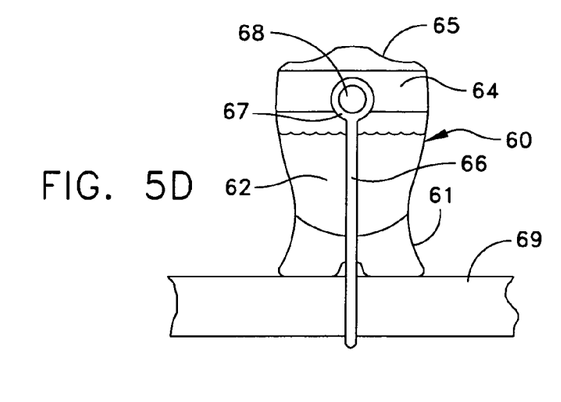
Figure 5E:
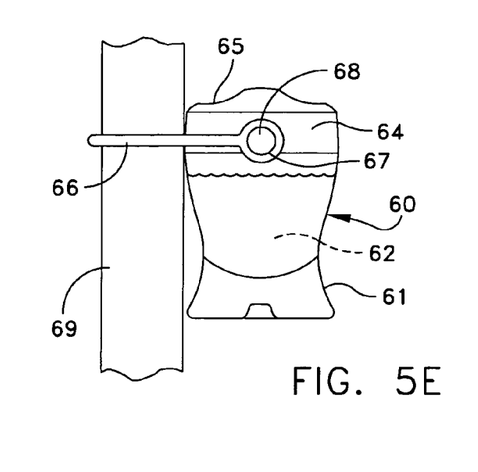

FIG. 4A also illustrates, in one position, the handle 55 being hung from a branch 58. The handle 55 is also shown in FIG. 4C in a position where the holder is tilted, or, alternatively, is simply supported on a flat surface 59, as shown in FIG. 4B. The ends 57 of the handle 55, as indicated previously, may slide within the slot 56. In addition, the ends 57 of the handle may also be locked in a particular position in the slot 56 so as to enable the holder to be tilted as illustrated in FIG. 4C. The ends 57 may be associated with a detent arrangement to enable the holder to be tilted in different positions.

Reference is now made to FIG. 5 for a further embodiment of the hummingbird feeder of the present invention. In this embodiment an elastic band is used for securing the feeder to objects or for hanging the feeder from objects. The feeder includes a base holder 60 that may be provided with legs 61 for support of the holder. Two or more legs 61 may be provided. FIG. 5A illustrates a nectar 62 within in the holder 60. The holder is preferably transparent so that the level of the nectar within the holder can be viewed. In addition to using a nectar, various other types of feed may also be stored in the holder.

The feeder of FIG. 5 also includes a cap or cover 64 that may be screwed onto the top of the holder or may be attached to the holder by other means. The cap or cover 64 is provided with through ports 65 to provide access for the bird into the holder. Two or more ports 65 may be used.

As indicated previously, the feeder illustrated in FIG. 5 is supported primarily by means of an elastic band 66 that has end loops 67. The cap or cover 64 is provided with diametrically disposed flanges 68 over which each of the end loops 67 extend. In one of the positions illustrated in FIG. 5A both ends of the elastic band 66 are disposed about the flanges 68. In another embodiment that is illustrated in FIG. 5B the elastic band 66 is disposed only about one of the flanges 68 and the construction of the other flange 68 is plainly shown. FIG. 5C shows the holder in a self-supporting arrangement. FIGS. 5D and 5E shows the elastic band 66 extending about different types of support structures 69 so that the feeder can be supported from either above, below or from the side.

Reference is now made to FIG. 6 for a further embodiment of the present invention in which the attachment means employs a flexible member, flexible leg or vine. In this embodiment the attachment means is in particular a stiff cable or wire arrangement that enables the feeder to be disposed in a variety of different positions and locations.

Figure 6A:
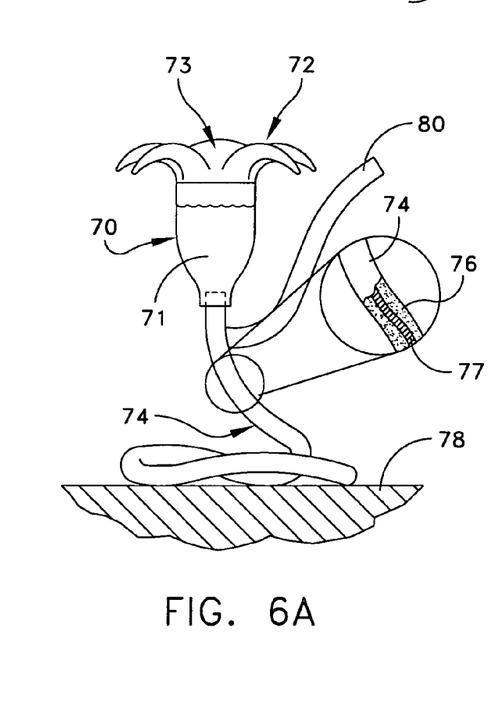
Figure 6B:
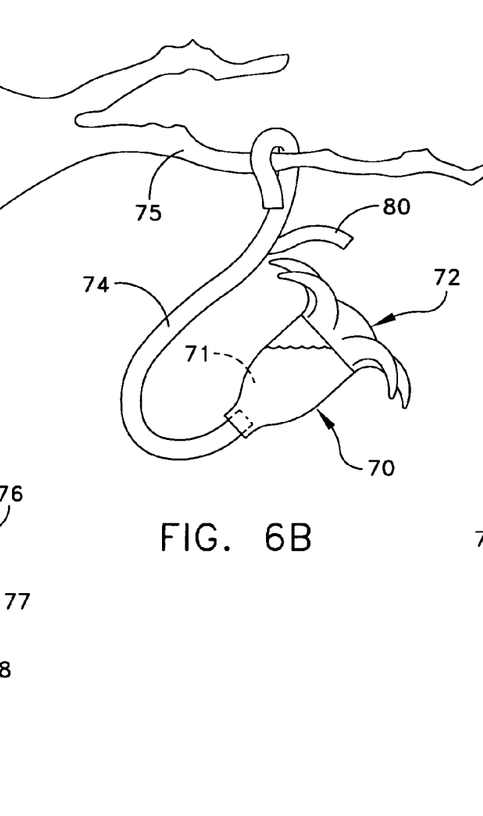
Figure 6C:
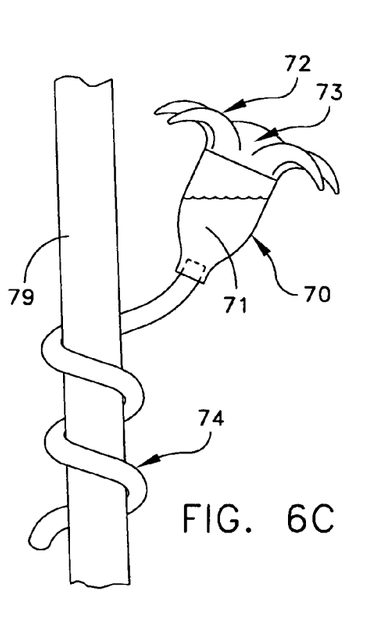

The bird feeder illustrated in FIGS. 6A-6C includes a base holder 70 for supporting feed such as nectar 71. The feeder also includes a cover or cap 72 that, in the embodiment of FIG. 6A, is illustrated as having a flower-like configuration. The cover 72 is provided with one or more open ports 73 through which the bird may feed. The cap 72 may be screwed onto the holder 70 or may be attached in other readily detachable ways. The petals of the flower cover form a type of perch arrangement, for some types of small birds.

The holder is supported by means of an attachment device that in this embodiment is a flexible line or vine 74. FIG. 6A also shows further details of this flexible line which preferably includes a center wire 77 and an outer rubber or foam sheath 76. This arrangement enables the flexible line 74 to be bent into various different configurations. Because of the use of a center wire, once the flexible line is bent into any particular configuration it is maintained in that configuration. FIGS. 6A-6C illustrates various configurations for the flexible line 74.

In FIG. 6B in one embodiment the flexible line 74 is curled at its distal end and supported from the branch 75. In another arrangement illustrated in FIG. 6A the bottom end of the flexible line 74 is bent or coiled into a configuration where it forms a stand for the holder 70 so that it can be maintained in an upright position on the base 78. In still another embodiment illustrated in FIG. 6C the flexible line 74 is wound about an upright pole 79. In this instance, the holder is illustrated as tilted slightly at an angle to the upright pole 79.

In the embodiment of FIGS. 6A and 6B there is also schematically illustrated different stems 80 that may be employed in association with the main flexible line 74. These side stems 80 may be used as a perch for the bird. The stem 80 may be constructed substantially the same as the main flexible line 74 including a center wire and an outer foam or rubber sheath. The stem is integrally attached to the main line 74.

Reference is now made to FIG. 7 for an illustration of sketches of additional embodiments of the feeder of the present invention. Many of these include attachment means similar to those described in FIGS. 1-6. The feeder itself in FIG. 7 is illustrated in a number of different configurations and shapes. Also, the cover or cap is also illustrated in different configurations. The attachment means illustrated in FIG. 7 takes on various configurations including clamping arrangements and ball and socket arrangements. One embodiment shown in FIG. 7D includes a flexible neck 90 for support between the base clamp 91 and the feed holder 92. Other arrangements illustrated in FIG. 7 include clamping members with pivotal or ball and socket joints at the feeder. See, for example, embodiments in FIGS. 7G, 7J and 7K, respectively at 93, 94 and 95.

Figure 7A:
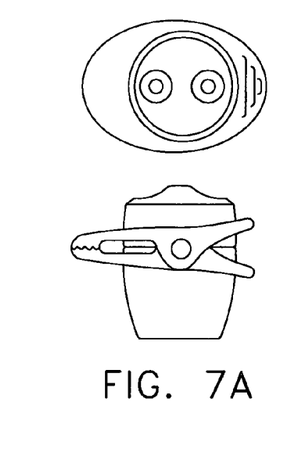
Figure 7B:
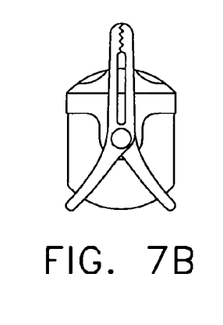
Figure 7C:
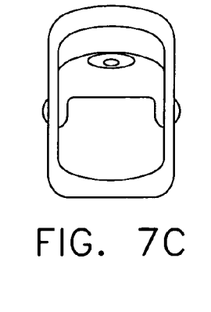
Figure 7D:
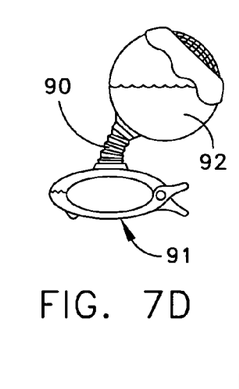
Figures 7E, 7F:
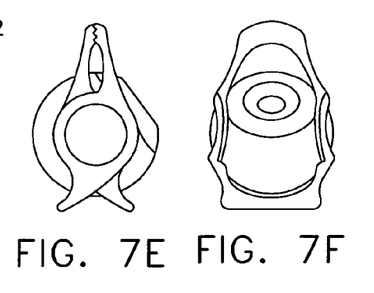
Figure 7G:
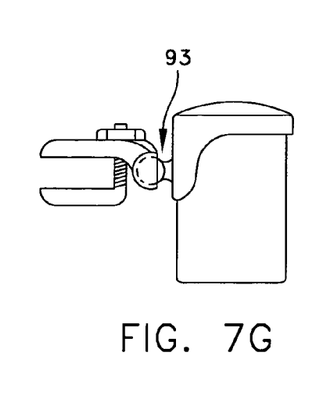
Figure 7H:
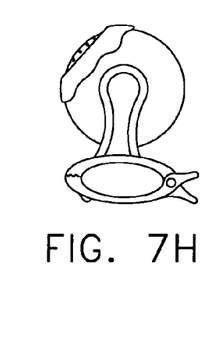
Figure 7I:
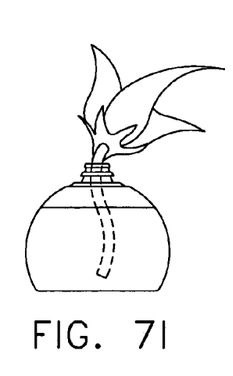
Figure 7J:
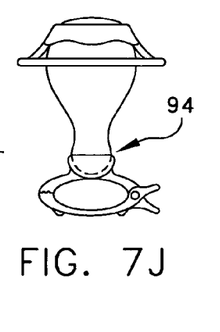
Figure 7K:
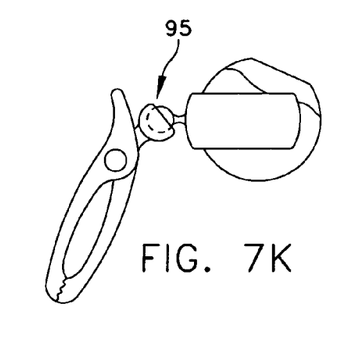

FIG. 7A shows a holder like that shown previously in FIG. 3. FIGS. 7B, 7C, 7E and 7F also show similar holders. FIG. 7D shows an embodiment like that shown in FIG. 1 but with the link replaced with a flexible length 90. FIG. 7I shows a different style of cover. FIG. 7J shows the use of a socket 94 at the base of the holder and between the holder and base clamp. Other socket arrangements are shown in FIGS. 7G and 7K.

In all of the embodiments described herein, the cover or cap has at least one port through which the bird can access the interior of the feed container. One of the unique aspects of the embodiments of the present invention is the miniature nature of the bird feeder. The depth of the holder of the feed, such as a nectar, is preferably in a range of 1-2.5 inches. Accordingly, the bird feeder described herein is of relatively small size. This also makes for a very portable feeder and one in which the attachment means provides a great deal of versatility as far as where the feeder can be attached.

Having now described a limited number of embodiments of the present invention, it should be apparent to those skilled in the art that numerous other embodiments and modifications thereof are contemplated as falling within the scope of the present invention as defined by the appended claims. For example, the feeder that is described includes a cover, however, in an alternate embodiment the cover may be optional in which case the opening in the holder is provided with a feed port that is suitable for access by a small bird such as a hummingbird.

What is claimed is:

1. A miniature size bird feeder comprising:
    a feed holder;
    a cap or cover over the feed holder;
    means for releasably attaching the cap or cover to the feed holder;
    and an attachment means for supporting the feed holder;
    wherein said attachment means comprises a clamp hanger;
    wherein said clamp hanger comprises a pair of pivot members supported by a pivot that is attached to the feed holder; and
    wherein said pivot members define at one end thereof a respective pair of jaws for securing to a separate member and at the other end thereof a respective pair of legs that are spacedly disposed.

2. A miniature size bird feeder of claim 1 including a pair of pivots that are disposed at opposed sides of the feed holder.

3. A miniature size bird feeder of claim 2
    wherein each pivot member comprises a continuous open loop member having, at the one end, one of the jaws of the pairs of jaws and, at the other end, one of the legs of the pair of legs.

4. A miniature size bird feeder of claim 3
    wherein the jaws are biased to a closed position and in the closed position thereof the legs are separated a maximum distance therebetween.

5. A miniature size bird feeder of claim 1
    wherein the length of the jaws measured from the pivot is greater than the length of the legs measured from the pivot.

6. A miniature size bird feeder of claim 1 wherein said cover or cap is engaged with said holder by being screwed thereon.

7. A miniature size bird feeder that includes a feed holder, a cap or cover over the feed holder, said cap or cover being provided with at least one feed port, said cap or cover being releasably attached to an opening in the feed holder, and an attachment member for supporting the feed holder either in a self-supporting manner or from another object;
    wherein said attachment member comprises a clamp hanger;
    wherein said clamp hanger comprises a pair of pivot members supported by a pivot that is attached to the feed holder;
    wherein said pivot members define at one end thereof a respective pair of jaws for securing to a separate member and at the other end thereof a respective pair of legs that are spacedly disposed.

8. A miniature size bird feeder of claim 7 including a pair of pivots that are disposed at opposed sides of the feed holder.

9. A miniature size bird feeder of claim 7
    wherein each pivot member comprises a continuous open loop member having, at the one end, one of the jaws of the pairs of jaws and, at the other end, one of the legs of the pair of legs.

10. A miniature size bird feeder of claim 7
    wherein the jaws are biased to a closed position and in the closed position thereof the legs are separated a maximum distance therebetween.

11. A miniature size bird feeder of claim 7
    wherein the length of the jaws measured from the pivot is greater than the length of the legs measured from the pivot.

* * * * *